J. OPPERUD.
ANIMAL TRAP.
APPLICATION FILED AUG. 13, 1909.
965,318.
Patented July 26, 1910.
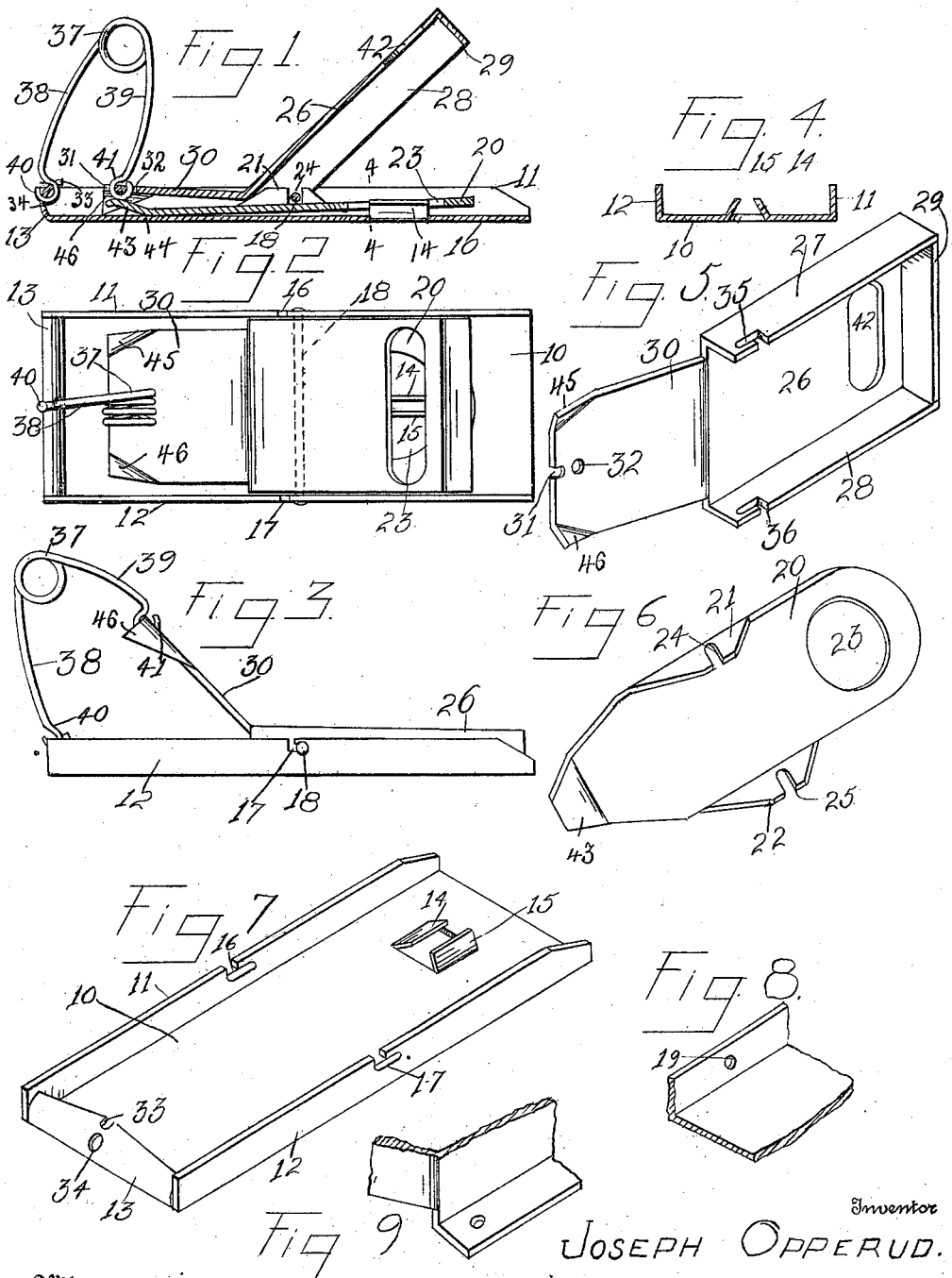
Witnesses
J. E. Strobel.
C. N. Woodward.
Inventor
JOSEPH OPPERUD.
By
Attorneys

UNITED STATES PATENT OFFICE.

JOSEPH OPPERUD, OF MADISON, SOUTH DAKOTA.

ANIMAL-TRAP.

965,318.  Specification of Letters Patent.  Patented July 26, 1910.

Application filed August 13, 1909. Serial No. 512,723.

*To all whom it may concern:*

Be it known that I, JOSEPH OPPERUD, a citizen of the United States, residing at Madison, in the county of Lake, State of South Dakota, have invented certain new and useful Improvements in Animal-Traps; and I do hereby declare the following to be a full, clear, and exact description of the invention, such as will enable others skilled in the art to which it appertains to make and use the same.

This invention relates to animal traps, and has for one of its objects to provide a simply constructed trap having no semi-detached parts and which may instantly "set" by simply compressing the striker member at one end.

Another object of the invention is to provide a simply constructed trap from which the trapped animal may be released by the operation of resetting the trap.

Another object of the invention is to provide a simply constructed trap wherein the force of the striker operating member is adjustable to increase or decrease its force without making any structural change in the device.

With these and other objects in view, the invention consists in certain novel features of construction as hereafter shown and described and then specifically pointed out in the claims, and in the drawings illustrative of the preferred embodiment of the invention, Figure 1 is a longitudinal sectional elevation with the trap in poised or set position. Fig. 2 is a plan view of the parts arranged as shown in Fig. 1. Fig. 3 is a side elevation of the improved trap in its sprung or closed position. Fig. 4 is a transverse section of the base member in section on the line 4—4 of Fig. 1. Fig. 5 is a perspective view of the striker portion of the improved device from beneath. Fig. 6 is a perspective view of the trip portion of the improved device from beneath. Fig. 7 is a perspective view of the base or body portion of the improved device viewed from above. Figs. 8 and 9 are detailed views of portions of the improved device illustrating modifications in the construction.

The improved device may be constructed wholly of metal, or partly of metal and partly of wood or other material, and may be of any required size to trap animals of various species, but is more particularly designed for use in trapping mice, and for the purpose of illustration a trap employed for this purpose is shown.

The improved trap comprises a base portion having a flat bottom 10 and vertical sides 11—12 spaced apart and with an inwardly curving portion 13 at one end, with the opposite end of the base portion open, as shown in Fig. 7. Formed in the bottom portion 10 near the open end are two spaced clefts and a connecting cleft whereby tongues 14—15 are released and adapted to be bent upwardly in inwardly inclined positions, to form a bait supporting cavity or recess, the bait being thrust upwardly from below and held by the inclined tongues 14—15.

Formed in the side members 11—12 intermediate the ends are openings 16—17, to receive a holding pin 18, the latter having enlarged heads to prevent its longitudinal displacement. The apertures 16 may be open and in bayonet joint form as shown in Fig. 3, or simple apertures as shown at 19 in Fig. 8, and it is not desired therefore to limit the invention to any specific form for the openings or apertures. When the apertures 19 are employed the pin 18 will be rigidly connected through the members 11—12, but when the open slots 16—17 are employed the pin will be removable, as hereafter explained.

The trip portion of the improved device comprises a flat sheet metal plate 20 having upwardly extending ears 21—22, and with a relatively large aperture 23 near one end, while the opposite end is bent upwardly as shown at 43. The ears 21—22 are provided with open recesses 24—25 to receive the pin 18. The trip member 20 extends beneath the pin 18 with the bent portion 44 adjacent to the upwardly extending terminal 43 bearing upon the base 10 and thus forming a fulcrum to the plate 20, as hereafter explained. The striker member of the trap comprises a plate 26 having depending side edges 27—28 and one depending end edge 29, while an extension 30 projects from the opposite end and is inclined relative to the plate 26, as shown. At its free end the extension 30 is provided with a recess or cavity 31 and an aperture 32 adjacent to the recess, while the curved terminal 13 of the base member 10 is provided with a similar recess 33 and an adjacent aperture 34, the object to be hereafter explained.

Formed in the side members 27—28 of the striker member are open bayonet joint-like slots 35—36 adapted to engage over the pin 18 between the sides 11—12 of the base member 10 and the ears 21—22 of the trip member. By this means the striker member is mounted to rock or swing upon the pin.

The striker member is designed to be actuated by a spring, and the spring comprises a coiled portion 37 and downwardly directed sides 38—39. The arm 38 is provided with a terminal hook 40 fitting through the aperture 34 and within the recess 33, while the arm 39 of the spring is provided with a terminal hook 41 fitting through the recess 31 and the aperture 32 of the striker member. The spring 37—38—39 and the striker member are so constructed that when the striker member is arranged in its poised position, as shown in Fig. 1, the central line of the spring will be located rearwardly of the coil 37, with the pressure applied to the upwardly directed terminal 43 as shown in Fig. 1. When in position the trip member is located as before stated with its aperture 23 encompassing the bait supporting tongues 14—15 but not obscuring them so that the mouse or other animal has free access to the bait. When thus arranged when the animal places its weight upon the trip member, the latter is depressed and the extension portion 43 of the trip member elevated, which movement thrusts the arm 39 of the spring forwardly to a sufficient extent to move the hook 41 to a point rearwardly of the center of the spring so that the force of the latter is instantly exerted to maintain the striker member in elevated position. With a trap thus constructed, the striker is set by simply depressing the extension 30 when the spring will automatically lock the striker member in its elevated position. Then the trap is sprung, as before described, by simply depressing the trip 20.

At its free ends the corners of the member 30 is bent downwardly as shown at 45—46, to form feet or supports to limit the downward movement of the member 30. The terminals of the bent portions 45—46 thus bear upon the base 10 when the trap is in its "set" position as shown in Fig. 1. The bent portions 45—46 are bendable outwardly or inwardly as required, to shorten or lengthen them and thus control the force of the spring. By bending the members 45—46 outwardly the distance of the portion 41 of the spring from the base 10 is decreased, so that the free end of the member 20 will be elevated in proportion, and then if the members 45—46 be bent inwardly the distance between the portion 41 and the base will be increased and the distance of the free end of the member 20 from the base 10 correspondingly increased. This adjustment of the members 45—46 also serves to adjust the spring, by changing the relative position of the point 40 upwardly or downwardly and thus regulating the tension of the trap, as by spreading the members 45—46 outwardly they permit the member 30 to be moved below an imaginary line between the pin 18 and the terminal 40 of the spring. If the portion of the striker is thus arranged to be moved downwardly too far below the imaginary line above noted the spring thereby exerts a downward pressure upon it, and the trap will thus be set too hard, and also require greater weight upon the trip member to trip it. In such a case all that is required to remove such objection is to bend the members 45—46 more nearly to a perpendicular position or at right angles to the member 20, so that they bear upon the base 10 in conjunction when the spring end 41 passes the imaginary line above referred to. This is a very important feature of the invention, and adds materially to its efficiency and utility, as when the striker member with its spring end or loop 40 is brought in line between the pin 18 and the spring terminal 40 the spring loses its power to exert any upward pressure upon the striker member, the portion 30 then becoming a "dead line." In order however, to cause the striker member to remain set or open, the point 41 must be brought slightly below this dead line, which is regulated by the bent portions 45—46 as above noted. When the parts are assembled the spring serves to firmly lock and hold the members together, and effectually prevents displacement so long as the spring remains coupled to the portions 13 and 30. While the parts are thus firmly supported, they are easily detachable or separable when required by simply detaching the terminal 40 from its aperture 34 and recess 30.

The striker member 26 is provided with a relatively large aperture 42 through which a portion of the body of the animal projects when the striker is actuated, and thus increases the effectiveness of the blow by providing a relatively narrow portion of the material of the striker between the aperture 42 and the terminal 29 of the same.

The improved device is simple in construction, can be inexpensively manufactured, and can be pressed from sheet metal entirely by machinery if preferred, and thus materially reducing the cost of manufacture. As before stated the base portion 10 of the clip may be of wood or other like material, while the remaining parts are of metal, and it is not desired therefore to limit the invention to the employment of any specific material for the parts.

While the form of the portions shown is the preferable one, it will be understood that changes may be made in the details of the construction within the scope of the appended claims without departing from the principle of the invention or sacrificing any of its advantages.

What is claimed is:—

1. An animal trap comprising a base having upturned sides, a pin extending through said sides, a striker device swinging upon said pin, and provided with an extension projecting at an angle to the longitudinal plane thereof, a trip device between said striker and base and with an upturned terminal, and a spring connected at one end to the base and at the other end to the extension of the striker device, and engaging said upturned terminal of the trip device.

2. An animal trap comprising a base having upturned sides, a pin extending through said sides, a striker device swinging upon said pin and with an extension projecting at an angle to the longitudinal plane thereof, a trip device between said striker and base and with an upturned terminal, and a spring formed with an intermediate coil and extending sides, one side connected at one end to the base and at the other end to the extension of the striker device and bearing upon said upturned terminal.

3. An animal trap comprising a base having upturned sides, a pin extending through said sides, a striker device formed with depending sides, and arranged to swing upon said pin and with an extension projecting at an angle to the longitudinal plane thereof, a trip device between said striker and base and with an upturned terminal, and a spring formed with an intermediate coil and extending sides, one side connected at one end to the base and at the other end to the extension of the striker device and bearing upon said upturned terminal.

4. In an animal trap, a striker member mounted for oscillation, a trip member having an upturned terminal, and a spring connected to said striker member and likewise engaging said upturned terminal of the trip member, said spring operating when in one position to maintain the striker member in elevated position and reversed in position by the depression of the trip member.

5. In an animal trap, a base, a striker member mounted for oscillation upon said base and formed with an extension projecting at an angle to the longitudinal plane thereof, said angular portion having downwardly bent terminals to bear upon the base to limit the movement of the striker and bendable laterally to adjust the movement of the same, a trip member having an upturned terminal, and a spring connected to said striker member and likewise engaging said upturned terminal of the trip member, said spring operating when in one position to maintain the striker member in elevated position and reversed in position by the depression of the trip member.

6. An animal trap comprising a base having upturned sides, a pin extending through said sides, a striker device swinging upon said pin and provided with an extension projecting at an angle to the longitudinal plane thereof, the terminals of said angular portion being bent downwardly to form adjustable supports to limit the movement of the striker, a trip device between said striker and base and with an upturned terminal, and a spring connected at one end to the base and at the other end to the extension of the striker device and engaging said upturned terminal of the trip device.

In testimony whereof, I affix my signature, in presence of two witnesses.

JOSEPH OPPERUD.

Witnesses:
   D. F. MACKAY,
   W. A. MACKAY.